United States Patent
Mukherjee et al.

(10) Patent No.: US 12,468,823 B2
(45) Date of Patent: Nov. 11, 2025

(54) EFFICIENT PROTECTION OF RECURRENT EVENT DATA FOR CALENDAR APPLICATIONS

(71) Applicant: Microsoft Technology Licensing, LLC, Redmond, WA (US)

(72) Inventors: Som Mukherjee, Kolkata (IN); R. J. Srinivas Gokavarapu, Bangalore (IN); Kushal Ghosh, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 18/323,861

(22) Filed: May 25, 2023

(65) Prior Publication Data
US 2024/0338461 A1    Oct. 10, 2024

(51) Int. Cl.
- *G06F 21/60* (2013.01)
- *G06F 21/10* (2013.01)
- *G06Q 10/1093* (2023.01)

(52) U.S. Cl.
CPC ....... *G06F 21/602* (2013.01); *G06Q 10/1093* (2013.01); *G06F 21/1062* (2023.08)

(58) Field of Classification Search
CPC .............. G06F 21/602; G06F 21/1062; G06Q 10/1093; G06Q 10/109
See application file for complete search history.

(56) References Cited

U.S. PATENT DOCUMENTS

| | | | |
|---|---|---|---|
| 7,499,942 B2 * | 3/2009 | Simison | G06F 16/282 707/999.102 |
| 2011/0320958 A1 | 12/2011 | Kashi | |
| 2015/0095645 A1 * | 4/2015 | Eldar | H04L 63/0485 713/168 |
| 2016/0259761 A1 * | 9/2016 | Laborczfalvi | G06Q 10/1093 |
| 2016/0357768 A1 | 12/2016 | Strong | |
| 2017/0220595 A1 * | 8/2017 | Hakami | G06Q 10/109 |

OTHER PUBLICATIONS

International Search Report and Written Opinion received for PCT Application No. PCT/US2024/022693, Jun. 25, 2024, 14 pages.

* cited by examiner

*Primary Examiner* — Catherine Thiaw
(74) *Attorney, Agent, or Firm* — NovoTechIP International PLLC (57) ABSTRACT

Systems and methods of protecting series event data for a calendar application include identifying an exception item of a series event to display in the user interface of a calendar application, locating a series data container for the series event that includes the exception item, and locating an exception container element in the series data container that stores the identified exception item. When the exception container element includes an exception attachment, the exception item is decrypted to retrieve body and attachment data for the exception item which is then displayed in the user interface of the calendar application. When the exception container element does not include an exception attachment, a series master attachment stored in a series container element of the series data container is decrypted to retrieve the body and attachment data for the exception item which is then displayed in the user interface of the calendar application.

20 Claims, 7 Drawing Sheets

EFFICIENT PROTECTION OF RECURRENT EVENT DATA FOR CALENDAR APPLICATIONS

BACKGROUND

Calendaring applications, also referred to as scheduling, productivity, and time-management applications, enable individuals, businesses, and groups to create and store calendars for scheduling and organizing meetings, appointments, events, reminders, and other information. Calendar applications are typically implemented as web-based applications which enable calendar information to be easily accessed, updated, and shared as needed. Web-based calendar applications are executed on servers which are networked to a plurality of personal computers running client programs. The client programs enable users to interact with the calendar application to add calendar items.

Calendar items may be added as single instance events or recurrent events. Recurrent events are a series of events following a particular recurrence pattern (e.g., every Monday, every first Tuesday of the month, every other Wednesday, and the like). Calendar applications enable a user to enter information to define each calendar item, such as title/subject, date, duration, attendees/invitees, recurrence pattern, and the like. Calendar applications also enable files, such as word processing documents, spreadsheets, pdfs, images, and the like, to be stored as attachments in association with calendar items. Each calendar item is stored in a separate data structure (along with any attachments) in a memory that is managed by the server, and a calendar data protection scheme is used to control access to the calendar items, e.g., by encrypting and decrypting calendar items as needed.

Rather than creating a calendar item for each instance in a recurrent event (also referred to herein as "series event" or "series"), calendar applications typically enable series events to be entered and saved as single calendar items. The calendar item for a series event includes information defining the default values for the series (e.g., title/subject, date, duration, attendees/invitees, and the like) and information defining the recurrence pattern for the series. Any modification made to any instance in a series results in the calendar application creating an exception item for that series. The exception item includes information that identifies the event instance that is modified as well as the modification or change made to the event instance.

Calendar data protection schemes, if implemented at all, typically involve a brute force method in which the entire calendar structure have typically handled exception items for series events as attachments which are embedded in the data structure for the series event. Because an exception item basically corresponds to a single instance event, each exception item is protected and subjected to access control requirements separately from the series event in which it is embedded. As a result, whenever an exception item is opened in the calendar application, the series event must be decrypted first to provide access to the exception item. The exception item may then be decrypted and loaded into the user interface (UI) for the calendar application. Similarly, while saving an exception item, the exception item must first be encrypted before it can be added to the series event as an embedded attachment. Once the embedded attachment has been added to the series event, the series event is then encrypted and stored.

Previously known calendar access control methods therefore typically require at least two decryption processes to access an exception item of a series event and at least two encryption processes to save an exception item of a series event. In comparison, single instance events as well as series events with no exceptions require a single decryption process to access and a single encryption process to save.

Encryption and decryption are performance intensive operations which can degrade application performance and adversely impact user experience. In addition, the user is blocked from performing any other action in the calendar application during the encryption/decryption process which can further impact user experience. Finding ways to increase the efficiency of protecting calendar items, especially series events, is therefore a worthwhile endeavor.

SUMMARY

In one general aspect, the instant disclosure presents a data processing system having a processor and a memory in communication with the processor wherein the memory stores executable instructions that, when executed by the processor, cause the processor alone or in combination with other processors to perform multiple functions. The function may include identifying an exception item of a series event to display in the user interface of a calendar application; locating a series data container for the series event that includes the exception item; locating an exception container element in the series data container that stores the identified exception item; determining whether the exception container element includes an exception attachment; when the exception container element includes the exception attachment, decrypting the exception item to retrieve body and attachment data for the exception item and displaying the exception item in a user interface of the calendar application with the body and attachment data; and when the exception container element does not include the exception attachment, decrypting a series master attachment stored in a series container element of the series data container to retrieve the body and attachment data for the exception item and displaying the exception item with the series event in the user interface of the calendar application with the body and attachment data.

In yet another general aspect, the instant disclosure presents a method for protecting series event data for a calendar application includes: identifying an exception item of a series event to display in the user interface of a calendar application; locating a series data container for the series event that includes the exception item; locating an exception container element in the series data container that stores the identified exception item; determining whether the exception container element includes an exception attachment; when the exception container element includes the exception attachment, decrypting the exception item to retrieve body and attachment data for the exception item and displaying the exception item in a user interface of the calendar application with the body and attachment data; and when the exception container element does not include the exception attachment, decrypting a series master attachment stored in a series container element of the series data container to retrieve the body and attachment data for the exception item and displaying the exception item with the series event in the user interface of the calendar application with the body and attachment data.

In a further general aspect, the instant application describes a non-transitory computer readable medium on which are stored instructions that when executed cause a programmable device to perform functions of receiving input identifying a series event to display in a user interface (UI) of a calendar application; locating a series data container for the series event in a memory, the series data container including a series container element and at least one exception container element pertaining to an exception of the series event, the series container element including an encrypted series master attachment that includes body and attachment data for the series event, the exception container element including an encrypted exception attachment that includes body and attachment data for the exception; decrypting the series master attachment to retrieve the body and attachment data for the series event without decrypting any encrypted exception attachments in the at least one exception container element; and displaying the series event in the UI of the calendar application with the body and attachment data for the series event.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Calendar applications enable calendar items to be added to a calendar as single instance events or series events. Each calendar item is stored in a separate data structure (along with any attachments) in a memory that is managed by the application, and a calendar data protection scheme is used to control access to the calendar items. Examples of data protection schemes that may be used in include Information Rights Management (IRM), Enterprise Digital Rights Management (E-DRM), Secure Multi-Purpose Internet Mail Extensions (S/MIME), and/or any suitable encryption/decryption scheme.

Rather than creating a calendar item for each instance in a recurrent event (also referred to herein as "series event" or "series"), calendar applications have enabled series events to be entered and saved as single calendar items. The calendar item for a series event includes information defining the default values for the series (e.g., title/subject, date, duration, attendees/invitees, and the like) and information defining the recurrence pattern for the series. Any modification made to any instance in a series results in the calendar application creating an exception item for that series. The exception item includes information that identifies the event instance that is modified as well as the modification or change made to the event instance.

Calendars have typically handled exception items for series events as attachments which are embedded within the data structure for the series event. The attachments must be encrypted before being embedded in the data structure. Therefore, encrypting a series event having exceptions typically requires two separate encryption operations to be performed each time an exception item is created or updated as a first encryption operation is performed to encrypt the exception attachment before the exception attachment is added to the data structure for the series event, and a second encryption operation is then performed to encrypt the data structure. Because an exception item is stored as an encrypted attachment embedded within an encrypted data structure, accessing the exception item to, for example, display the exception item in the UI of the calendar application requires that a first decryption process be performed to unpack the data structure and then a second decryption operation to be performed to decrypt the exception attachment to retrieve the information for the exception item. Double encryption and decryption are used in previously known systems because some modifications or changes to a series event, resulting in an exception, may require more restricted access relative to the series event. For example, if a series event is modified by adding new attendees and/or removing one or more default attendees, it may be beneficial to prevent new attendees from accessing the rest of the series and to prevent omitted attendees from accessing the information of the exception. As a result, exception items are typically encrypted and decrypted separately from the series event.

In any case, previously known data protection schemes typically require two decryption processes when retrieving exception item data for a series event and two encryption processes when saving exception item data for a series event. Encryption and decryption processes are resource intensive. For example, each encryption and decryption can take on average 4-5 seconds to complete. The user is blocked from performing any other action in the calendar application during an encryption/decryption operation. Therefore, having to perform multiple encryption/decryption operations to create, modify, and save series events can cause relatively long delays which decreases the efficiency of using the application. Such delays can also be frustrating to users and result in adverse user experience of the application.

To address these technical problems and more, in an example, this description provides technical solutions in the form of a data structure and data protection scheme that enables series event information and exception item information to be stored in the same file and that enables exception item information to be retrieved from the file and saved to the file structure using a single encryption/decryption operation. As discussed below, the data structure for a series event is provided as a data container that includes a separate container element for storing the default body and attachment data for a series event and a separate container element for each exception item of the series event for storing the body and attachment data pertaining to each exception item. This structure enables the encrypted data for the exception items to be stored outside of the encrypted data for the series event while still enabling all of the sensitive or confidential information pertaining to the series event and exception items to remain protected. Each exception item can be accessed directly and decrypted without having to decrypt the series data. Similarly, because encrypted exception items are not embedded within another encrypted data structure, exception items can be created, updated, and saved without having to perform an extra encryption operation.

The technical solutions described herein address the technical problem of inefficiencies and difficulties associated with protecting series event data including exception items. The solutions described herein reduce the number of encryption/decryption processes that need to be performed to retrieve/save exception items for series event which can increase the efficiency of the utilization of calendar applications. The solutions also reduce delays and downtime associated encrypting/decrypting series event information which can improve a user experience of software applications.

Figure 1:
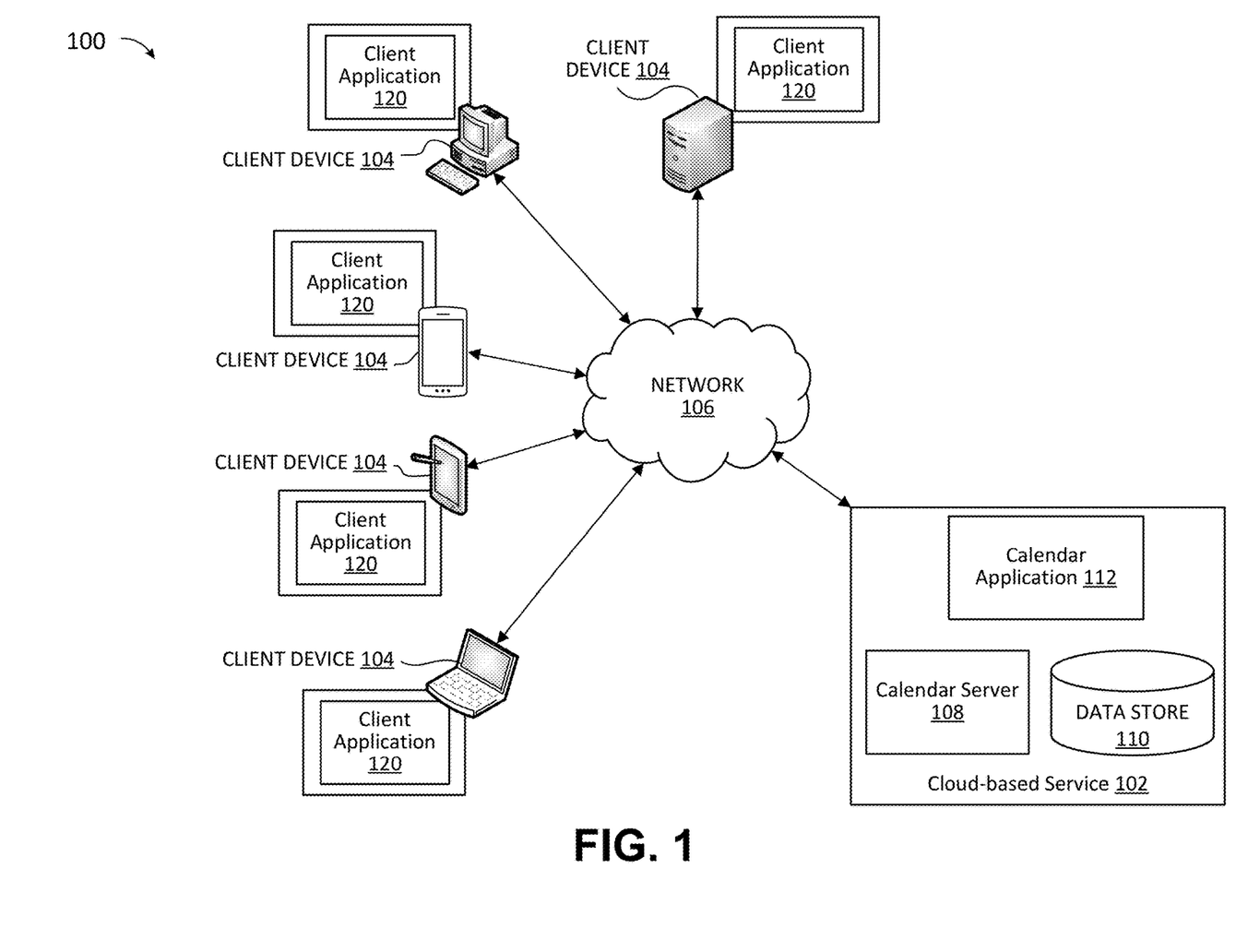
FIG. 1 depicts an example system upon which aspects of this disclosure may be implemented.

FIG. 1 shows an example computing environment 100, in which aspects of this disclosure may be implemented. Computing environment 100 includes a cloud-based service 102, client devices 104 and a network 106. Cloud-based service 102 is configured to provide at least a calendar service to users of the client devices 104 that enables users to create and access one or more calendars and to facilitate scheduling of events and meetings. To this end, cloud-based service 102 includes a calendar server 108 which is configured to provide computational and/or storage resources for implementing the cloud-based service 102. Server 108 hosts data and/or content in connection with the calendar service and makes this data and/or content available to the users of client devices 104 via the network 106. User data and/or content for the calendar service is stored in a data store 110. Although a single server 108 and data store 110 are shown in FIG. 1, cloud-based service 102 may utilize any suitable number of servers and/or data stores.

A calendar application 112 is executed on the server 108. Calendar application 112 is a web-based application that enables users to access and interact with the calendar service provided by the cloud-based service 102. The calendar application 112 is configured to enable users to create, modify, and delete calendar items, including series event creation and modification. Calendar application 112 is also configured to manage the storage of calendar items in the data store 110. Calendar server 108 and/or calendar application 112 supports communications and data operations in multiple languages and/or protocols including, but not limited to, structured query language ("SQL"), hyper-text transfer protocol ("HTTP"), extensible markup language ("XML"), JAVA, JAVASCRIPT, C++, C#, C, active server pages ("ASP"), variants and combinations thereof, and the like.

Client devices 104 enable users to request access to services and/or applications offered by cloud service providers, such as the calendar service provided by the cloud-based service 102. Clients 104 comprise any suitable type of computing device, such as personal computers, desktop computers, laptop computers, mobile telephones, smart phones, tablets, phablets, smart watches, wearable computers, gaming devices/computers, televisions, and the like. Each client device 104 includes at least one client application 120 that are executed on the client device 104 and that enable access to the calendar service provided by the cloud-based service 102. In some embodiments, client applications 120 comprise a web browser for accessing and displaying data and/or content from the calendar application 112. In other embodiments, client applications 120 are local applications programmed to communicate and interact with the calendar application 112.

The network 106 is a conventional type, wired, wireless, and/or a combination of wired and wireless networks and may have numerous different configurations. In embodiments, the network 106 includes one or more local area networks (LAN), wide area networks (WAN) (e.g., the Internet), public networks, private networks, virtual networks, mesh networks, peer-to-peer networks, and/or other interconnected data paths across which multiple devices may communicate. In embodiments, the network 106 is coupled to or includes portions of a telecommunications network for sending data in a variety of different communication protocols. In some implementations, the network 106 includes Bluetooth® communication networks or a cellular communications network for sending and receiving data including via short messaging service (SMS), multimedia messaging service (MMS), hypertext transfer protocol (HTTP), direct data connection, WAP, email, and the like.

Figure 2:
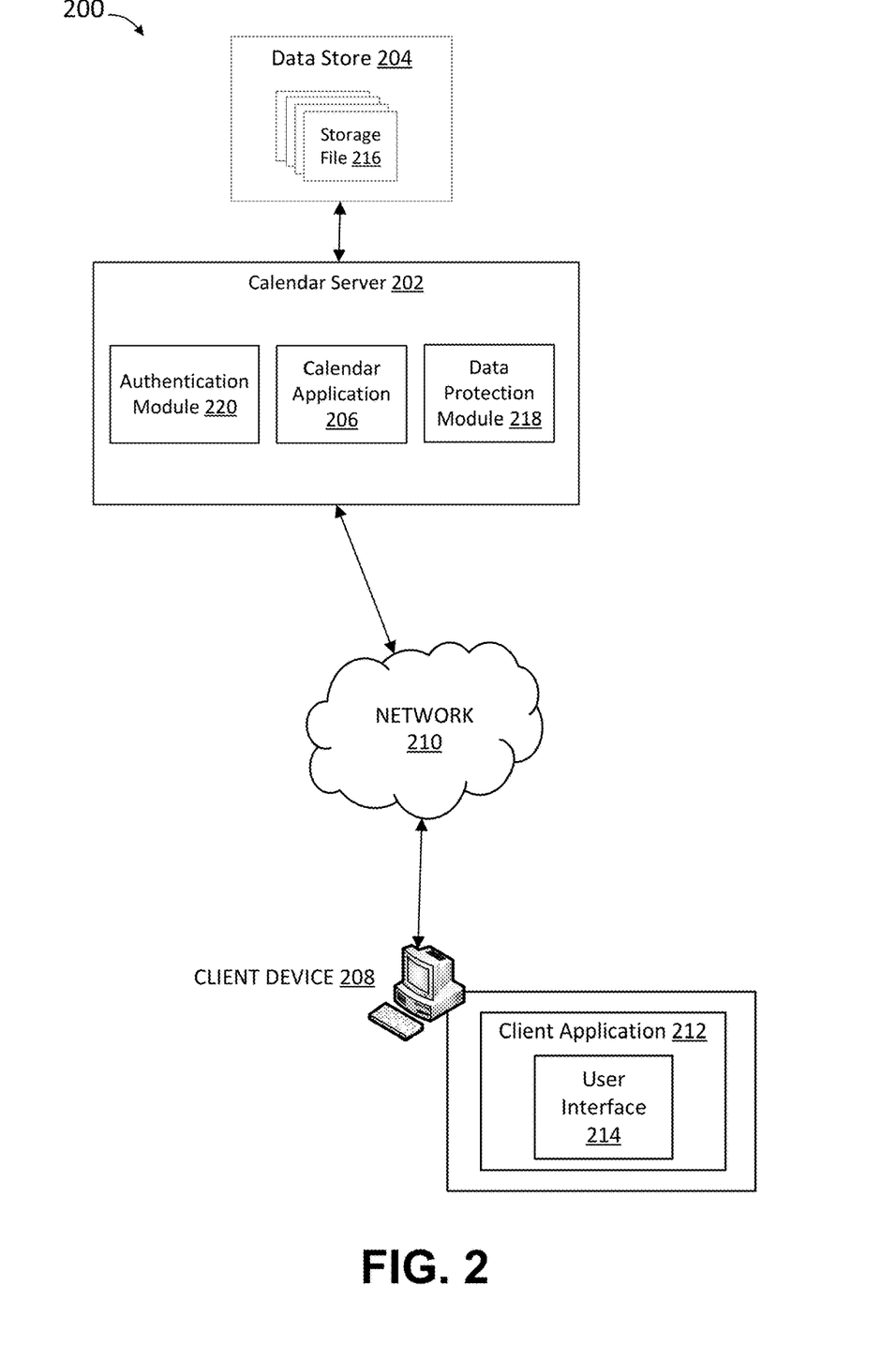
FIG. 2 depicts an example implementation of a calendar service which may be implemented in the system of FIG. 1.

An example implementation of a calendar service 200 that can be implemented by the cloud-based service 102 of FIG. 1 is shown in FIG. 2. The calendar service 200 includes a calendar server 202 and a data store 204. The calendar server 202 executes a calendar application 206 which is a web-based application. Calendar server 202 enables client applications on client devices, such as client application 212 on client device 208, to access calendaring features implemented by calendar application 206 via a network 210. Features implemented by the calendar application 206 include, but are not limited to, the creation and storage of calendars and calendar items for scheduling and organizing meetings, appointments, events, reminders, and other information. To this end, calendar application 206 is configured to enable a user interface (UI) 214 to be displayed on a display of the client device 208. In embodiments, the UI 214 is provided by the calendar application 206 and displayed using a web browser application on the client device 208. In other embodiments, the UI is implemented by a native application on the client device 208 that is programmed to communicate with the calendar server 202 over the network 210. The UI 214 enables users to interact with the calendar application 206 and access the features and functionality it provides. In embodiments, the UI 214 is configured to enable users to request to create calendar items, including single event calendar items and series event calendar items, and to input calendar item definitions.

A calendar item definition specifies the metadata for a calendar item as well as body and attachment information for the calendar item. The metadata defines a number of attributes for the calendar item, such as the calendar that the item is to be added to, the title of the item, the type of event (e.g., single instance or series), the date and/or duration of the item (e.g., date, date range, time, and/or time range), other users for inviting and/or sharing the calendar item, and, in the case of series events, the recurrence pattern for the item (e.g., once a week on Monday for two months, once a month on the first Tuesday of the month for six months, and the like). The body and attachment information includes the text that is to be displayed with the calendar item in the calendar application and the file attachments for the calendar item.

Figure 3:
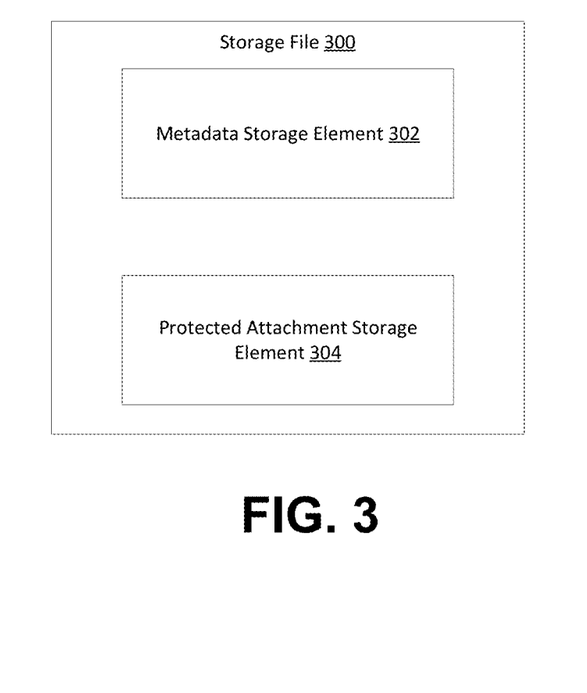
FIG. 3 is a diagram of an example storage file for storing a calendar item for a calendar application.

In response to receiving a calendar item definition, the calendar application 206 causes a storage file 216 to be created in the data store 204 for storing the information and data pertaining to the calendar item. An example diagram of a storage file 300 is shown in FIG. 3. In embodiments, the storage file is a data container, such as a compound file, capable of storing and organizing multiple objects, such as files and data streams, of various formats within a single file. The storage file 300 includes a metadata storage element 302 and an attachment storage element 304. In embodiments, the attachment storage element is a protected storage element (e.g., encrypted) if the calendar item is protected. In some embodiments, both the attachment storage element and the metadata storage element are protected and may be encrypted in a single attachment if the calendar item is protected. When the calendar item is not protected, the storage elements do not have to be protected. The metadata storage element 302 is used to store metadata pertaining to a calendar item, and the protected attachment storage element 304 is used to store the body and attachment information for a calendar item which have been encrypted to form a protected attachment which is stored in the protected attachment storage element 304. The protected attachment is protected in a manner that controls access to and prevents unauthorized access of the body and attachment information for a calendar item. To this end, the calendar server 202 includes a data protection module 218 for generating the storage files 216 including protected attachments based on a predetermined data protection scheme. In embodiments, the data protection scheme involves writing the body and file attachments to a file and encrypting the file to form an encrypted attachment. Metadata for the calendar item is stored in metadata for the storage file, such as the metadata storage element 302 of FIG. 3. In embodiments, metadata for the calendar item also specifies access controls for the calendar item. In embodiments, access controls for a calendar item are specified by the author of the calendar item and/or by an organization associated with the author (e.g., organizational permissions/restrictions). In embodiments, the data protection scheme implemented by the data protection module includes one or more of IRM, E-DRM, S/MIME, and any other suitable encryption and/or access control scheme.

The data store 204 includes one or more data storage devices having any suitable type of memory including volatile and/or nonvolatile media (e.g., ROM; RAM, magnetic disk storage media; optical storage media; flash memory devices, and/or other suitable storage media) and/or other types of computer-readable storage media configured to store data. In embodiments, storage files are stored in a database or other suitable file system or data structure in the data store 204 that enables protected data items to be stored, organized, and retrieved.

The calendar application 206 is also configured to enable users to select calendar items to view via the user interface and to enable calendar items to be modified and/or deleted. For example, the UI 214 is designed to enable a user to select one or more calendar items to display in the UI 214, e.g., by clicking on a calendar item or by specifying input specifying search and/or filter parameters, such as a date, a date range, keyword(s), etc., to identify one or more calendar items to view. In response to receiving user input indicating a selection of a calendar item to view, the calendar application 206 causes the data protection module 218 to locate the storage file 216 corresponding to the selected calendar item and decrypt the protected attachment to retrieve body and attachment data for the calendar item. Once retrieved, the calendar application 206 loads the body and file attachments into the UI 214.

The calendar application 206 enables calendar items to be modified and/or deleted based on user input received via the UI 214. As noted above, if the calendar item modified or deleted corresponds to an instance of a series event, the calendar application 206 creates an exception item for the series event. For example, a user may change the date and/or time of an instance of a series event, or change the list of users that an instance of a series event is shared with. Once the user provides input indicating that a modification of an instance of a series event should be saved (e.g., by clicking on a save button), the calendar application generates an exception item for the series event. The exception item includes metadata identifying the instance of the series that is modified as well as information specifying the modification or change to the instance.

As noted above, previously known calendar data protection schemes have typically handled exception items for series events as attachments which are encrypted and then embedded in the protected data item for the series event. As a result, whenever a user desires to open an exception item, the series event must be decrypted first to access the exception item. The exception item can then be decrypted and loaded into the UI for the calendar application. Similarly, to save an exception item, the exception item must be encrypted before it can be added to the series event. Once the embedded attachment has been created, the attachment is added to the series event, and the series event with attachments is encrypted according to the data protection scheme implemented. In either case, previously known data protection schemes required two decryption processes or two encryption processes when series instances are loaded and when series instances are saved, respectively. Each encryption and decryption can take on average 4-5 seconds to complete. The user is blocked from performing any other action in the calendar application during the encryption/decryption operations. This is done primarily to prevent a user from performing another action on the same calendar item while it is being encrypted which could result in race issues, data inconsistencies, synchronization issues, program failures, and the like. Therefore, having to perform multiple encryption/decryption operations to create, modify, and save series events can cause relatively long delays which decreases the efficiency of using the application. Such delays can also be frustrating to users and result in adverse user experience of the application.

To increase the efficiency and reduce delays associated with creating and modifying series events, a data structure and data protection scheme are implemented in the calendar application that involves generating a series data container for each series event. The series data container includes a series container element that stores the default information and data for the series. The default metadata for the series is stored in metadata for the series container element. The default body and file attachments for the series are stored in a series master attachment that is encrypted and embedded in the series container element. The series data container also contains an exception container element for each exception item in the series. Exception container elements include metadata for storing changes to metadata of the series event.

For each exception item involving a change to the body, file attachments, and/or attendees of the series, a protected exception attachment is generated that includes the body and attachments for the exception and embedded in the exception container element for the exception. For exception items that do not involve a change to the body, attachments, or attendees, a protected exception attachment is not required. In this case, the series master attachment is used as the exception attachment for the exception, so the body, attachments, and attendees are inherited from the series master. Each exception is therefore considered to have a single attachment. As a result, a series data container for a series event having n exceptions will therefore now contain n+1 attachments (i.e., n exception attachments and one series master attachment). Each attachment is encrypted and decrypted according to the data protection scheme implemented by the calendar application. Any suitable data protection scheme can be utilized. In embodiments, the series master attachment and the exception attachments are encrypted and decrypted using an IRM workflow such that the attachments are generated as message.rpmsg files, or other files as per various versions of IRM.

Because each protected exception attachment is stored in the series data container and encrypted separately from the series master attachment, the series data does not have to be unpacked to access an exception item. Rather, each exception attachment can be accessed directly and decrypted without having to decrypt the encrypted series data first. As a result, only a single decryption process is required to retrieve and load an exception item in the UI of the calendar application. Similarly, because encrypted exception items are not embedded within another encrypted data structure, exception items can be created, updated, and saved without having to perform an extra encryption operation after the exception attachment is encrypted and a series data container is generated.

Figure 4:
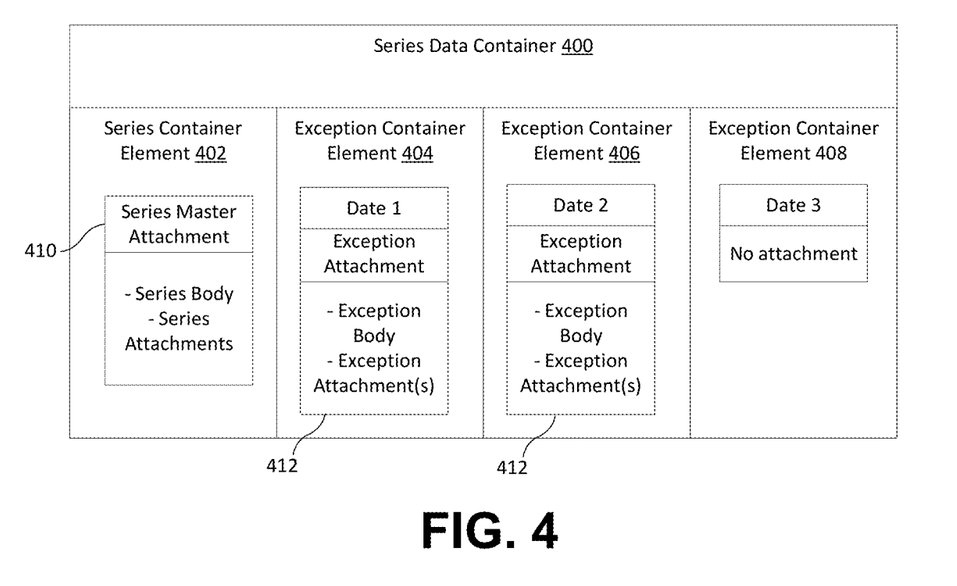
FIG. 4 is a diagram of an example implementation of a series data container for storing a series event for a calendar application.

An example implementation of a series data container 400 for a series event is shown in FIG. 4. The series data container 400 is a data structure, such as a compound file, capable of storing and organizing multiple objects, such as files and data streams, of various formats within a single file. In the embodiment of FIG. 4, the series data container 400 includes one series container element 402. The series container element 402 includes a series master attachment 410 that includes the default body and attachments for the series event. The series master attachment 410 is encrypted using the data protection scheme implemented by the calendar application used to create the series event. Series event metadata is stored in metadata for the series container element.

The series data container 400 also includes a plurality of exception container elements 404, 406, 408. The number of exception container elements 404, 406, 408 corresponds to the total number of exception items for the series, which in this case is three. The exception items associated with the exception container elements 404, 406 include changes to the body, attachments, and/or attendees of the series master. As a result, exception container elements 404, 406 each include an exception attachment 412 that stores the body and attachments for the associated exception item. The exception attachments 412 are encrypted using the same data protection scheme used to encrypt the series master attachment. The exception item associated with the exception container element 408 does not include changes to the body, attachment, or attendees.

Figure 5:
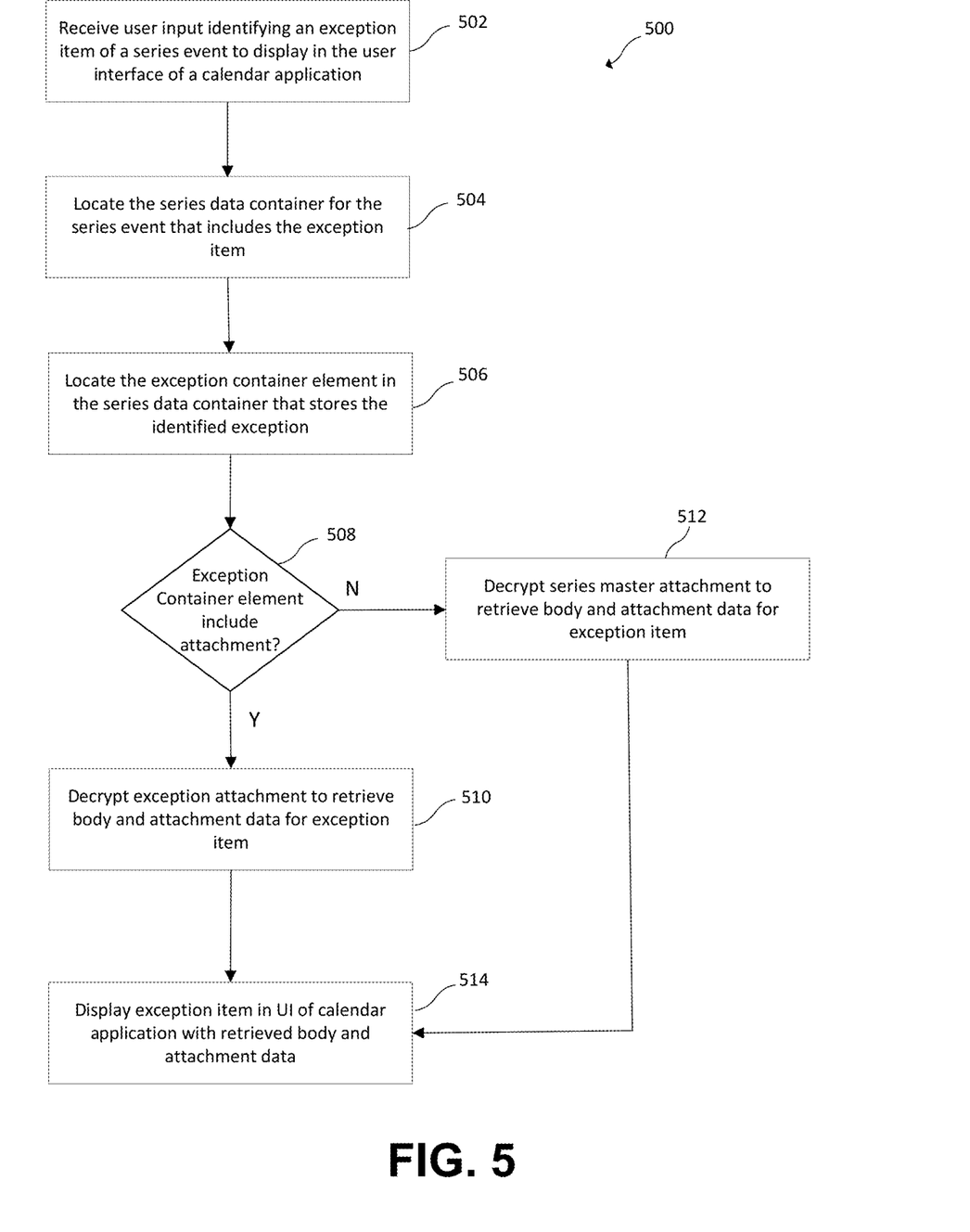
FIG. 5 is a flowchart of a method for protecting series event data for a calendar application.

Referring now to FIG. 5, a flowchart of a method 500 of protecting series event data for a calendar application is depicted. The method 500 begins with receiving user input identifying an exception item of a series event to display in the user interface of a calendar application (block 502). The calendar application then locates the series data container for the series event that includes the exception item (block 504) and locates the exception container element in the series data container that stores the identified exception item (block 506). A determination is then made as to whether the exception container element includes an exception attachment (block 508). If the exception container element includes the exception attachment, the exception attachment is decrypted to retrieve the body and attachment data for the exception item (block 510). If the exception container element does not include the exception attachment, the series master attachment is decrypted to retrieve body and attachment data for the exception item (block 512). In either case, the exception item is displayed in the UI of the calendar application with the body and attachment data (block 514).

Figure 6:
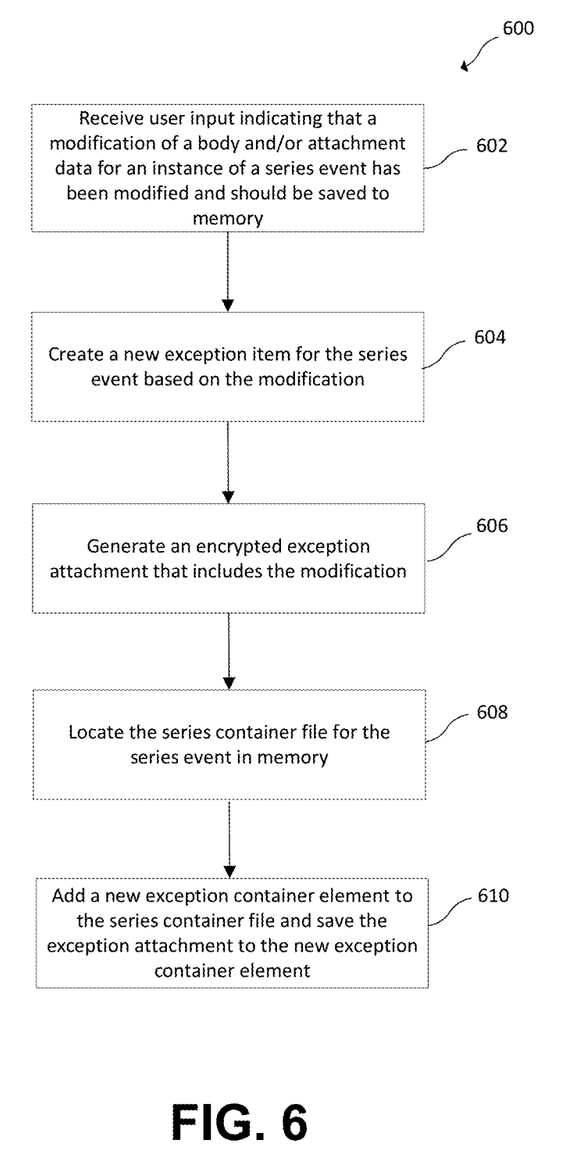
FIG. 6 is a flowchart of another method for protecting series event data for a calendar application.

FIG. 6 shows an example of another method 600 of protecting series event data for a calendar application. The 600 begins with receiving user input indicating that a modification of a body and/or attachment data of an instance of a series event has occurred and should be saved to memory (block 602). In response to receiving the input, a new exception item is generated based on the modification (block 604). The body and attachment data is then encrypted to generate an exception attachment (block 606). The series container file for the series event is located in the memory (block 608). The series container file includes a series master attachment that stores default body and attachment data for the series event and default metadata for the series event. A new exception container element is added to the series container file and the exception attachment is saved to the new exception container element outside of the series master attachment (block 610).

Figure 7:
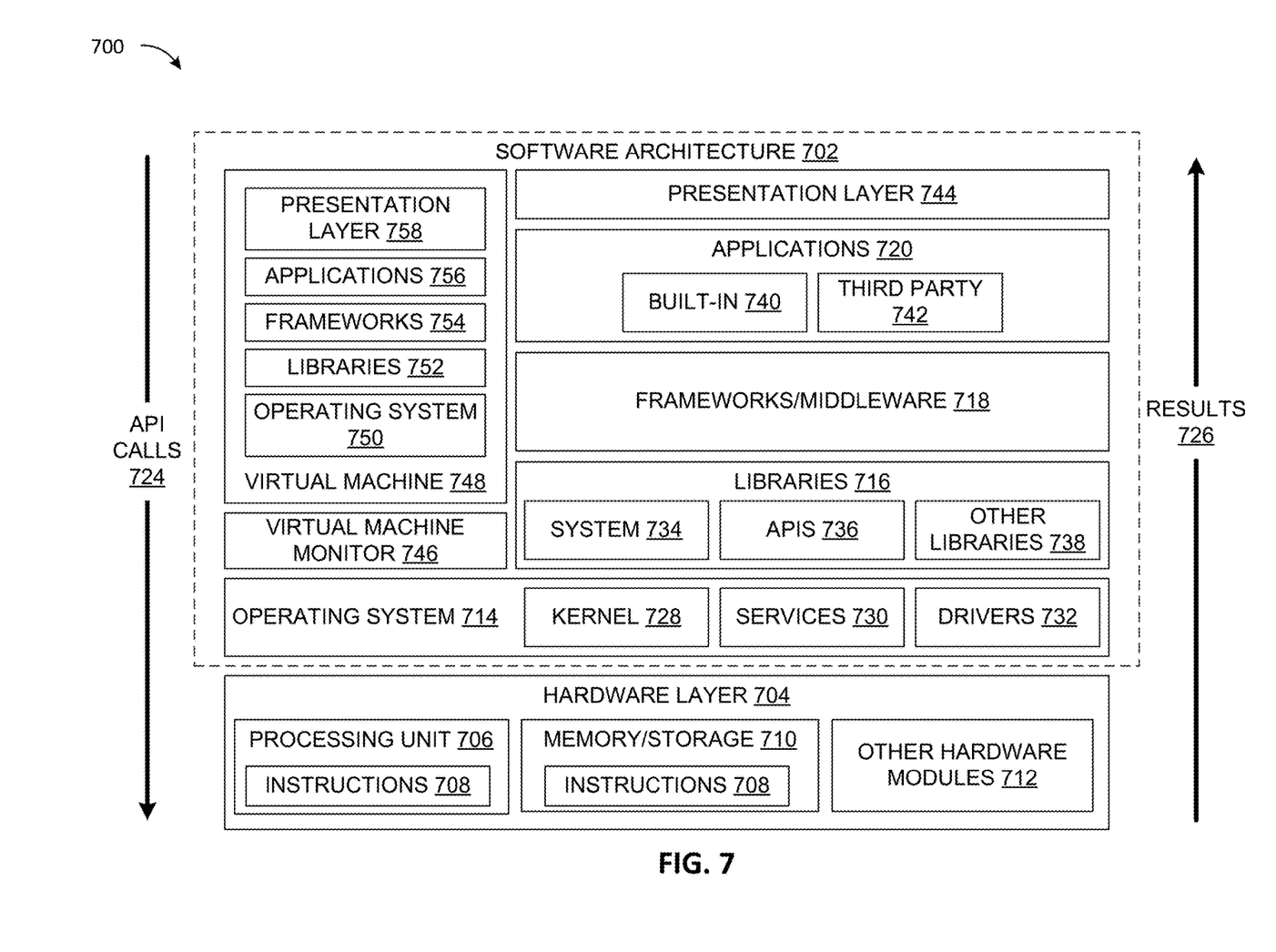
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. This software architecture may represent the software of the cloud-based service 102 or other component shown in FIGS. 1 and 2 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
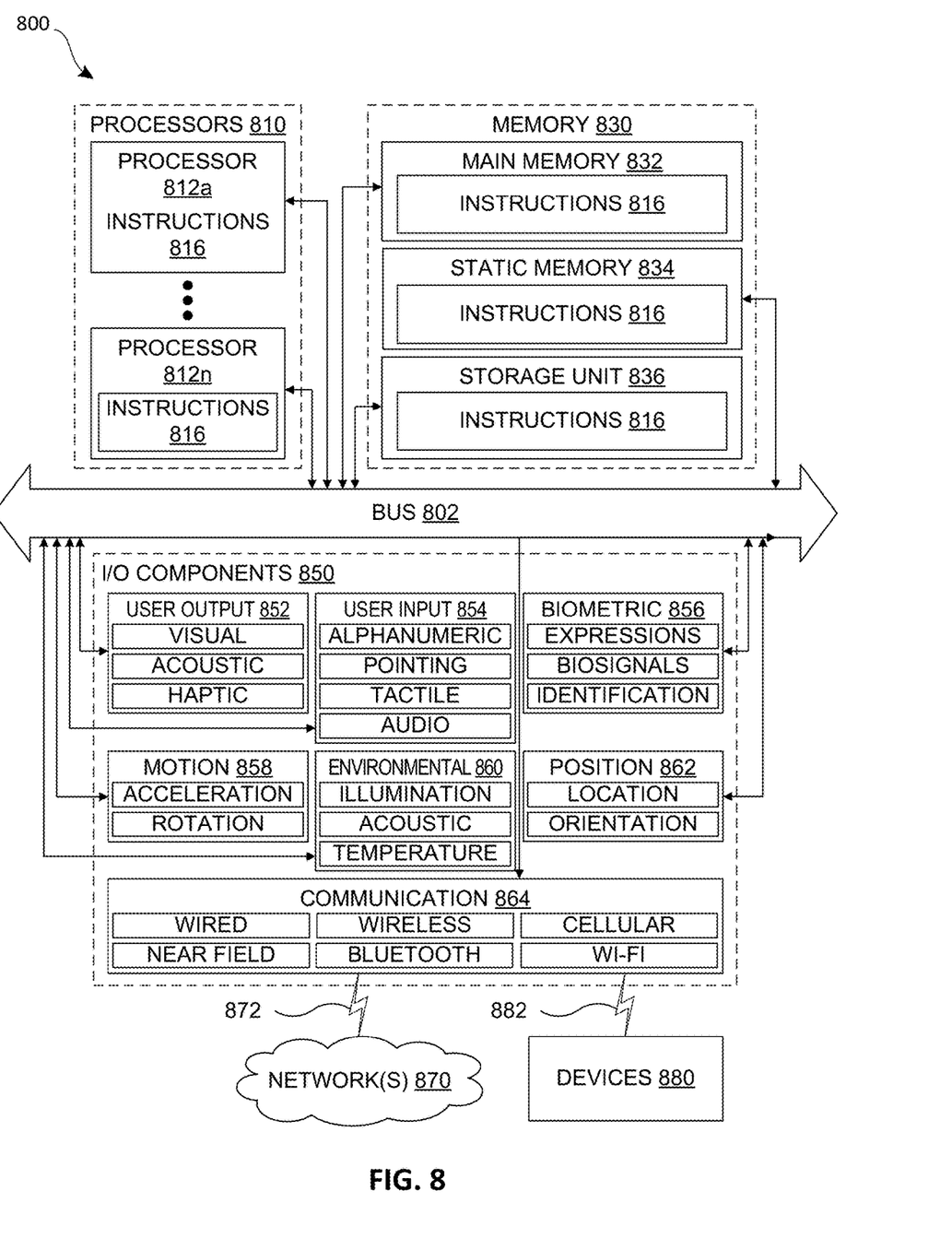
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. This example machine may represent the hardware of the cloud-based service 102 or other components shown in FIGS. 1 and 2.

As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1. A data processing system comprising:
  a processor; and
  a memory in communication with the processor, the memory comprising executable instructions that, when executed by the processor, cause the data processing system to perform functions of:
    identifying an exception item of a series event to display in the user interface of a calendar application;
    locating a series data container for the series event that includes the exception item;
    locating an exception container element in the series data container that stores the identified exception item;
    determining whether the exception container element includes an exception attachment;
    when the exception container element includes the exception attachment, decrypting the exception item to retrieve body and attachment data for the exception item and displaying the exception item in a user interface of the calendar application with the body and attachment data; and when the exception container element does not include the exception attachment, decrypting a series master attachment stored in a series container element of the series data container to retrieve the body and attachment data for the exception item and displaying the exception item with the series event in the user interface of the calendar application with the body and attachment data.

Item 2. The data processing system of item 1, wherein the exception attachment and the series master attachment are encrypted using at least one of Information Rights Management (IRM), Enterprise Digital Rights Management (E-DRM), and Secure Multi-Purpose Internet Mail Extensions (S/MIME), and wherein the exception attachment and the series master attachment have a file format dependent on which encryption method is used for encrypting the exception attachment and the series master attachment.

Item 3. The data processing system of any of items 1-2, wherein IRM is used to encrypt the exception attachment and the series master attachment, and wherein the exception attachment and the series master attachment each comprise message.rpmsg files.

Item 4. The data processing system of any of items 1-3, wherein the series data container includes an exception container element for each exception of the series event.

Item 5. The data processing system of any of items 1-4, further comprising:

receiving input that modifies at least one of the body and the attachment of the exception item and indicates that the modified exception item should be saved;

in response to receiving the input, encrypting the body and the attachment of the exception item to form an exception attachment; and storing the exception attachment in the exception container element of the exception item in the series data container of the series event.

Item 6. The data processing system of any of items 1-5, wherein default metadata for the series event is stored in the series container element.

Item 7. The data processing system of any of items 1-6, wherein, when the exception item includes changes to the default metadata for the series event, metadata identifying the changes to the default metadata is stored in the exception container element.

Item 8. The data processing system of any of items 1-7, wherein the calendar application is implemented on a calendar server and/or a client device.

Item 9. A method of protecting series event data for a calendar application, the method comprising:

identifying an exception item of a series event to display in the user interface of a calendar application;

locating a series data container for the series event that includes the exception item;

locating an exception container element in the series data container that stores the identified exception item;

determining whether the exception container element includes an exception attachment;

when the exception container element includes the exception attachment, decrypting the exception item to retrieve body and attachment data for the exception item and displaying the exception item in a user interface of the calendar application with the body and attachment data; and when the exception container element does not include the exception attachment, decrypting a series master attachment stored in a series container element of the series data container to retrieve the body and attachment data for the exception item and displaying the exception item with the series event in the user interface of the calendar application with the body and attachment data.

Item 10. The method of item 9, wherein the exception attachment and the series master attachment are encrypted using at least one of Information Rights Management (IRM), Enterprise Digital Rights Management (E-DRM), and Secure Multi-Purpose Internet Mail Extensions (S/MIME).

Item 11. The method of any of items 9-10, wherein IRM is used to encrypt the exception attachment and the series master attachment, and wherein the exception attachment and the series master attachment each comprise message.rpmsg files.

Item 12. The method of any of items 9-11, wherein the series data container includes an exception container element for each exception of the series event.

Item 13. The method of any of items 9-12, further comprising:

receiving input that indicates that modifies at least one of the body and the attachment of the exception item and indicates that the modified exception item should be saved;

in response to receiving the input, encrypting the body and the attachment of the exception item to form an exception attachment; and storing the exception attachment in the exception container element of the exception item in the series data container of the series event.

Item 14. The method of any of items 9-13, wherein default metadata for the series event is stored in the series container element.

Item 15. The method of any of items 9-14, wherein, when the exception item includes changes to the default metadata for the series event, metadata identifying the changes to the default metadata is stored in the exception container element.

Item 16. The method of any of items 9-15, wherein the calendar application is implemented on a calendar server and/or a client device.

Item 17. A non-transitory computer readable medium on which are stored instructions that, when executed, cause a programmable device to perform functions of:

receiving input identifying a series event to display in a user interface (UI) of a calendar application;

locating a series data container for the series event in a memory, the series data container including a series container element and at least one exception container element pertaining to an exception of the series event, the series container element including an encrypted series master attachment that includes body and attachment data for the series event, the exception container element including an encrypted exception attachment that includes body and attachment data for the exception;

decrypting the series master attachment to retrieve the body and attachment data for the series event without decrypting any encrypted exception attachments in the at least one exception container element; and displaying the series event in the UI of the calendar application with the body and attachment data for the series event.

Item 18. The computer readable medium of item 17, wherein the series master attachment and the exception attachments are encrypted using at least one of Information Rights Management (IRM), Enterprise Digital Rights Management (E-DRM), and Secure Multi-Purpose Internet Mail Extensions (S/MIME).

Item 19. The computer readable medium of any of items 17-18, wherein IRM is used to encrypt the exception attachment and the series master attachment, and wherein the exception attachment and the series master attachment each comprise message.rpmsg files.

Item 20. The computer readable medium of any of items 17-19, wherein the series data container includes an exception container element for each exception of the series event.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory including executable instructions that, when executed by the processor, cause the processor alone or in combination with other processors to perform functions of:
identifying an exception item of a series event to display in a user interface of a calendar application;
locating a series data container for the series event that includes the exception item;
locating an exception container element in the series data container that stores the identified exception item;
determining whether the exception container element includes an exception attachment;
when the exception container element includes the exception attachment, decrypting the exception item to retrieve body and attachment data for the exception item and displaying the exception item in the user interface of the calendar application with the body and attachment data; and
when the exception container element does not include the exception attachment, decrypting a series master attachment stored in a series container element of the series data container to retrieve the body and attachment data for the series master attachment and displaying the exception item with the body and attachment data of the series master attachment in the user interface of the calendar application.

2. The data processing system of claim 1, wherein the exception attachment and the series master attachment are encrypted using at least one of Information Rights Management (IRM), Enterprise Digital Rights Management (E-DRM), and Secure Multi-Purpose Internet Mail Extensions (S/MIME), and
wherein the exception attachment and the series master attachment have a file format dependent on which encryption method is used for encrypting the exception attachment and the series master attachment.

3. The data processing system of claim 2, wherein IRM is used to encrypt the exception attachment and the series master attachment, and
wherein the exception attachment and the series master attachment each comprise message.rpmsg files.

4. The data processing system of claim 1, wherein the series data container includes an exception container element for each exception of the series event.

5. The data processing system of claim 1, further comprising:
receiving input that modifies at least one of a body and an attachment of the body and attachment data of the exception item and indicates that the modified exception item should be saved;
in response to receiving the input, encrypting the body and the attachment of the exception item to form the exception attachment; and
storing the exception attachment in the exception container element of the exception item in the series data container of the series event.

6. The data processing system of claim 1, wherein default metadata for the series event is stored in the series container element.

7. The data processing system of claim 6, wherein, when the exception item includes changes to the default metadata for the series event, metadata identifying the changes to the default metadata is stored in the exception container element.

8. The data processing system of claim 1, wherein the calendar application is implemented on a calendar server and/or a client device.

9. A method of protecting series event data for a calendar application, the method comprising:
identifying an exception item of a series event to display in a user interface of the calendar application;
locating a series data container for the series event that includes the exception item;
locating an exception container element in the series data container that stores the identified exception item;
determining whether the exception container element includes an exception attachment;
when the exception container element includes the exception attachment, decrypting the exception item to retrieve body and attachment data for the exception item and displaying the exception item in the user interface of the calendar application with the body and attachment data; and
when the exception container element does not include the exception attachment, decrypting a series master attachment stored in a series container element of the series data container to retrieve the body and attachment data for the series master attachment and displaying the exception item with the body and attachment data of the series master attachment in the user interface of the calendar application.

10. The method of claim 9, wherein the exception attachment and the series master attachment are encrypted using at least one of Information Rights Management (IRM), Enterprise Digital Rights Management (E-DRM), and Secure Multi-Purpose Internet Mail Extensions (S/MIME).

11. The method of claim 10, wherein IRM is used to encrypt the exception attachment and the series master attachment, and
wherein the exception attachment and the series master attachment each comprise message.rpmsg files.

12. The method of claim 9, wherein the series data container includes an exception container element for each exception of the series event.

13. The method of claim 9, further comprising:
receiving input that modifies at least one of a body and an attachment of the body and attachment data of the exception item and indicates that the modified exception item should be saved;
in response to receiving the input, encrypting the body and the attachment of the exception item to form the exception attachment; and
storing the exception attachment in the exception container element of the exception item in the series data container of the series event.

14. The method of claim 9, wherein default metadata for the series event is stored in the series container element.

15. The method of claim 14, wherein, when the exception item includes changes to the default metadata for the series event, metadata identifying the changes to the default metadata is stored in the exception container element.

16. The method of claim 9, wherein the calendar application is implemented on a calendar server and/or a client device.

17. A non-transitory computer readable medium on which are stored instructions that, when executed, cause a programmable device to perform functions of:

receiving input identifying an exception item of a series event to display in a user interface (UI) of a calendar application;

locating a series data container for the series event in a memory, the series data container including a series container element and at least one exception container element pertaining to the exception item of the series event, the series container element including an encrypted series master attachment that includes body and attachment data for the series event;

decrypting the series master attachment to retrieve the body and attachment data for the series event without decrypting any encrypted exception attachments in the at least one exception container element; and displaying the exception item in the UI of the calendar application with the body and attachment data for the series event.

18. The computer readable medium of claim 17, wherein the series master attachment and the exception attachments are encrypted using at least one of Information Rights Management (IRM), Enterprise Digital Rights Management (E-DRM), and Secure Multi-Purpose Internet Mail Extensions (S/MIME).

19. The computer readable medium of claim 18, wherein IRM is used to encrypt the exception attachment and the series master attachment, and wherein the exception attachment and the series master attachment each comprise message.rpmsg files.

20. The computer readable medium of claim 17, wherein the series data container includes an exception container element for each exception of the series event.

* * * * *